(12) United States Patent
Fleischer et al.

(10) Patent No.: US 7,950,413 B2
(45) Date of Patent: May 31, 2011

(54) ELECTROMAGNETIC PRESSURE REGULATING VALVE DEVICE HAVING AN INTEGRATED PRESSURE SENSOR

(75) Inventors: Walter Fleischer, Stuttgart (DE); Klaus Schudt, Nordheim (DE); Christof Ott, Asperg (DE); Ulrich Foerch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 743 days.

(21) Appl. No.: 11/795,724

(22) PCT Filed: Dec. 13, 2005

(86) PCT No.: PCT/EP2005/056724
§ 371 (c)(1),
(2), (4) Date: Mar. 18, 2008

(87) PCT Pub. No.: WO2006/079434
PCT Pub. Date: Aug. 3, 2006

(65) Prior Publication Data
US 2008/0265190 A1    Oct. 30, 2008

(30) Foreign Application Priority Data

Jan. 28, 2005  (DE) .................... 10 2005 004 080

(51) Int. Cl.
*F16K 31/36* (2006.01)
(52) U.S. Cl. ................. 137/487.5; 251/129.15
(58) Field of Classification Search ............ 251/129.15, 251/129.04; 137/487.5, 625.65, 596.17, 137/557

See application file for complete search history.

(56) References Cited

U.S. PATENT DOCUMENTS

| 4,796,661 | A | | 1/1989 | Hishinuma et al. |
| 5,006,901 | A | * | 4/1991 | Dick ............................ 335/258 |
| 5,918,856 | A | * | 7/1999 | Scharnowski et al. ... 251/129.15 |
| 6,155,233 | A | * | 12/2000 | Wade et al. .................... 123/458 |
| 6,328,065 | B1 | * | 12/2001 | Schmid et al. ........... 137/596.17 |
| 6,422,206 | B1 | | 7/2002 | Wade et al. |
| 6,748,976 | B2 | * | 6/2004 | Sato et al. ................ 137/625.65 |
| 6,854,707 | B2 | * | 2/2005 | Miyazoe ................... 251/129.15 |
| 6,929,031 | B2 | * | 8/2005 | Ford et al. ..................... 137/884 |
| 7,004,450 | B2 | * | 2/2006 | Yoshimura et al. ...... 251/129.15 |
| 7,383,851 | B2 | * | 6/2008 | Jacobsen et al. ................ 137/14 |

(Continued)

FOREIGN PATENT DOCUMENTS

EP    0 357 964    3/1990

(Continued)

*Primary Examiner* — John K Fristoe, Jr.
*Assistant Examiner* — Marina Tietjen
(74) *Attorney, Agent, or Firm* — Kenyon & Kenyon LLP

(57) ABSTRACT

An electromagnetic pressure regulating valve device for regulating a hydraulic pressure including at least one pressure regulating valve which includes a solenoid part having at least one bobbin holding an electric coil, a coil core and a movably guided armature; a valve part having at least one supply connection, one return connection, one load connection and one actuating element operated by the armature and cooperating with a valve seat; and an electronic part having at least one pressure sensor for measuring the hydraulic pressure present at the load connection. At least the pressure sensor is situated on an end of the solenoid part facing the valve part upstream from the electronic part. Positioning the pressure sensor close to the valve part may substantially reduce the filter effect of the transmission link, and the hydraulic pressure to be measured is therefore transmittable free of errors up to a much higher cutoff frequency. This may result in a higher measurement accuracy, and therefore also a higher regulation accuracy, of the pressure regulating valve.

12 Claims, 2 Drawing Sheets

U.S. PATENT DOCUMENTS

| | | |
|---|---|---|
| 2003/0029180 A1 | 2/2003 | Martin et al. |
| 2005/0039807 A1* | 2/2005 | Ford et al. ............. 137/884 |
| 2005/0045237 A1 | 3/2005 | Dean |
| 2010/0269632 A1* | 10/2010 | Dlugoss ............. 74/732.1 |

FOREIGN PATENT DOCUMENTS

| | | |
|---|---|---|
| EP | 0 840 017 | 5/1998 |
| EP | 0 971 278 | 1/2000 |
| EP | 1 236 898 | 9/2002 |
| EP | 1 406 142 | 4/2004 |
| JP | 61-66843 | 4/1986 |
| JP | 63-130980 | 6/1988 |
| JP | 63-208626 | 8/1988 |
| JP | 2002-213632 | 7/2002 |
| JP | 2002-317881 | 10/2002 |
| JP | 2004-11859 | 1/2004 |
| JP | 2004-360889 | 12/2004 |
| WO | WO 03/056404 | 7/2003 |

* cited by examiner

ELECTROMAGNETIC PRESSURE REGULATING VALVE DEVICE HAVING AN INTEGRATED PRESSURE SENSOR

FIELD OF INVENTION

The present invention relates to an electromagnetic pressure regulating valve device for regulating a hydraulic pressure, including a pressure regulating valve having a solenoid part which includes at least one bobbin holding an electric coil, a coil core and a movably guided armature; a valve part which includes at least one supply connection, one return connection, one load connection, and a valve closing member operated by the armature and cooperating with a valve seat; and an electronic part which includes at least one pressure sensor for measuring the hydraulic pressure present at the load connection.

BACKGROUND INFORMATION

To activate clutches in stepped automatic transmissions, pilot valves having downstream hydraulic amplifier elements or actuators are used to vary clutch pressures. The pilot pressure in this case is set, i.e., controlled, via a forward-directed active chain. This principle has two important disadvantages: It is not possible to adequately compensate either the time variance of the controlled system, due to changes in the ambient conditions (such as temperature), or disturbance variables (such as changes in supply pressure). Both the stationary and dynamic performance are therefore unsatisfactory. These disadvantages are largely eliminated by a closed control loop, an important component of the control loop being a sensor element measuring the control variable, a pressure sensor in the present case.

It is advantageous to integrate the pressure sensor into the electrohydraulic actuator of the control loop, i.e., into the pressure regulating valve, since this reduces assembly work on the part of the customer. A system of this type is described, for example, in the European Patent No. EP 0 971 278 A1. In this patent, the pressure to be regulated is measured by a pressure sensor situated in the solenoid part and, more specifically in an armature housing, of the pressure regulating valve. For this purpose, the pressure signal present in the valve part must be guided through the armature housing. The pressure connection routed through the armature housing for this purpose corresponds in the hydraulic sense to a long duct of comparatively high geometric complexity and length and represents a hydraulic transmission link along which the measured variable pressure is filtered. As a result, both the amplitude and phase of the signal changes, which is disadvantageous insofar as the pressure signals are transmittable true to original only up to a relatively low cutoff frequency. Consequently, undesirable corruption of the measurement result may occur.

SUMMARY

The present invention relates to measuring the hydraulic pressure to be measured as close as possible to the valve part, since this is where the pressure change is produced. The pressure sensor is therefore provided on an end of the solenoid part facing the valve part. Positioning the pressure sensor close to the valve part substantially reduces the filter effect of the transmission link, and the hydraulic pressure to be measured is therefore transmittable free of errors up to a much higher cutoff frequency. This results in a higher measurement accuracy, and therefore also a higher regulation accuracy, of the pressure regulating valve.

Positioning the pressure sensor directly on or in the valve part itself may not be possible in practice due to the fact that pressure regulating valves are often inserted via their valve part into a receptacle hole of a valve block, and only the solenoid part protrudes from the receptacle hole. Due to space constraints, therefore, the pressure sensor connected to electric cables may not be able to be placed directly on the valve part.

In the case of the electromagnetic pressure regulating valve described in European Patent No. EP 0 971 278 A1, the pressure sensor must be connected to the remotely situated control unit via five electric lines, one line being used to transmit the pressure sensor signal, a further line serving as a ground line for the pressure sensor, a further line supplying voltage to the pressure sensor, a further line serving as a ground line for the coil and a further line supplying voltage to the coil. However, this gives rise to the danger of the sensor signal being corrupted due to electromagnetic interference.

According to a particularly preferred embodiment of the present invention, not only the pressure sensor but also the signal and power electronics are integrated into the electronic part of the electromagnetic pressure regulating valve to operate the latter. In this case, low-power sensor signals are transmitted on very short paths within the electronic housing, and the EMC sensitivity is reduced. For example, in addition to the pressure sensor, the electronic part integrated into the pressure regulating valve also includes at least one of the following devices: A voltage supply for the pressure sensor, a communication interface to a higher-level electronic control unit, a microprocessor or analog control electronics which calculate the manipulated variable from a deviation between an actual pressure value and a setpoint pressure value, power electronics for supplying voltage to the coil, capacitors for filtering the signal and for EMC (electromagnetic compatibility) protection as well as a diagnostic device. The higher-level electronic control unit may be designed to activate multiple pressure regulating valves; however, the deviations of the different pressure regulating valves should preferably be calculated in the electronic part of the particular pressure regulating valve itself.

Due to the shorter distances for the electrical transmission of the sensor signals, costly shielding may be eliminated. In integrating the control and power electronics into the pressure regulating valve, this may be implemented using only three connecting lines. The supply voltage is transmitted via one line, the reference variable (pressure) and diagnosis/status information via a further bidirectional line, while a third line forms the connection to ground. This reduces the number of connecting lines between the central control unit and the pressure regulating valve from five to three lines. In particular, it may be advantageous if low-power-conducting lines are eliminated, and along with them the problem of the resulting poor self-cleaning of contacts in contaminated environments. The only signal line thus transmits, for example, both the reference variable and the diagnosis/status signal using a bidirectional protocol. A pulse-width-modulated signal, for example, is used to improve electromagnetic sturdiness. The transmission may be carried out digitally and using timing. This protocol has the following advantages:

It is sturdy vis-à-vis electromagnetic interference.
It may be filtered without substantial impairment, so that it emits little interference voltage itself (low phase shift may be tolerated for transmitting the reference variable).

Its current intensity may be set in such a way that the self-cleaning of electric contacts is of sufficient quality, and power loss nevertheless does not become too high.

The electronic part is preferably situated in the area of an end of the coil facing the valve part, when the valve part of the pressure regulating valve is inserted into a receptacle hole of a valve block, particularly preferably in the area of a parting plane between the valve part and the solenoid part protruding from the receptacle hole, more specifically between the end of the coil facing the valve part and the parting plane.

According to a first variant, the electronic part may be flange-mounted directly onto a bobbin holding the coil. According to a second variant, the electronic part may be flange-mounted directly onto a filter holder holding a filter assigned to the load connection and at least partially surrounding the valve part.

In both cases, a short hydraulic connection must be provided between the pressure sensor and the load connection or a pressure chamber provided in the valve part and connected to the load connection, this hydraulic connection being provided in the bobbin in the first variant and in the filter holder in the second variant.

The layout of an example system according to the present invention is explained on the basis of the following description of exemplary embodiments.

DETAILED DESCRIPTION OF EXAMPLE EMBODIMENTS

Figure 1:
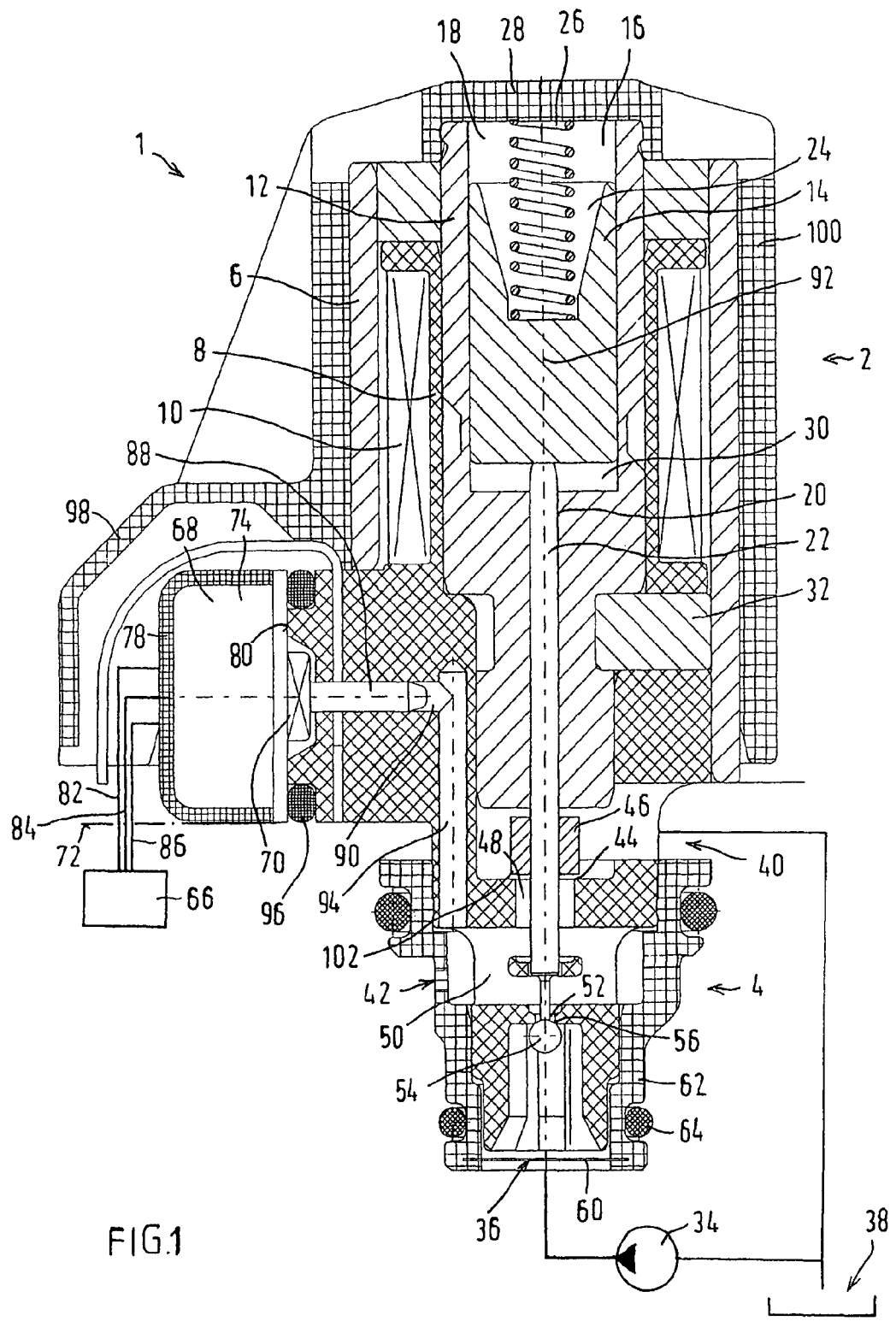
FIG. 1 shows a cross-sectional illustration of an electromagnetic pressure regulating valve according to a preferred embodiment of the present invention.

The preferred exemplary embodiment shown in FIG. 1 of an electromagnetic pressure regulating valve 1 of a pressure regulating valve device according to the present invention is used, for example, to regulate the hydraulic control pressure of a hydraulic clutch in a stepped automatic transmission of a motor vehicle. Pressure regulating valve 1 includes, among other things, a solenoid part 2 and a valve part 4.

Solenoid part 2 is enclosed by a solenoid sleeve 6 and includes a coil 10 wound on a bobbin 8, a coil core 12 projecting into the interior of coil 10 and an armature 14 which is movably guided in the axial direction in coil core 12. For this purpose, coil core 12 has a stepped core hole 16 in whose larger-diameter section 18 armature 14 is guided, while an actuating piston 22 is located in a longitudinally movable manner in a hole section 20 of smaller diameter which is adjacent to the valve part, the actuating piston contacting an end face of armature 14 on one end. Via a centering hole 24 on its other end face, armature 14 is supported by a restoring spring 26 against a cap 28 mounted on the end of coil core 12 facing away from valve part 4. A working clearance 30 exists in the axial direction between the one end face of armature 14 and the bottom of larger-diameter hole section 18 of core hole 16. Viewed from the axial direction, bobbin 8 generally extends from a free end of solenoid part 2 to the free end of valve part 4, the bobbin supporting a flow fork 32 on its end facing valve part 4.

Valve part 4, in turn, includes a supply connection 36, which is connected, for example, to the pressure side of a pressure generator 34, a return connection 40 connected to a tank 38 for the hydraulic fluid, a load connection 42 connected to the clutch and an actuating element 46 operated by armature 14 and cooperating with a valve seat 44. The actuating element, for example, is formed by a seating disk 46 supported by actuating piston 22, which cooperates with a flat seat 44 provided in bobbin 8. Flat seat 44 is provided on an edge of a central through-hole 48 of bobbin 8, which connects return connection 40 to a pressure chamber 50 when seating disk 46 is raised from flat seat 44. On the other side of pressure chamber 50, bobbin 8 has a further through-hole 52 designed as a throttle hole through which actuating piston 22 projects on the other end and is contactable with a closing ball 54 which is able to close or release a valve seat 56 provided on the edge of throttle hole 52 facing away from pressure chamber 50 as a function of the position of actuating piston 22 and thereby establish or block a flow connection between pressure chamber 50 and supply connection 36 on the bottom of valve part 4. A screen filter 60 situated upstream from supply connection 36 in the direction of flow prevents contaminants in the hydraulic fluid from entering pressure regulating valve 1.

Screen filter 60 is held by a sleeve-shaped filter holder 62 which largely surrounds the entire circumference of valve part 4. In particular, filter holder 62 forms a circumferential wall of pressure chamber 50, in which load connection 42 is provided, and supports O-rings 64 on its radially outer circumferential surface, which are intended to prevent the outflow of hydraulic fluid against the wall (not illustrated) of a receptacle hole into which valve part 4 is inserted and from which solenoid part 2 protrudes. Additional pressure regulating valves may be accommodated in the valve block and activated by a common, higher-level electronic control unit 66.

Pressure regulating valve 1 also has an electronic part 68, which includes at least one pressure sensor 70 for measuring the hydraulic pressure present at load connection 42. Electronic part 68 including pressure sensor 70 is preferably situated in the area of an end of coil 10 facing valve part 4, and in the present case when valve part 4 of pressure regulating valve 1 is inserted into a receptacle hole of a valve block, particularly preferably in the area of a parting plane 72 between valve part 4 and solenoid part 2 protruding from the receptacle hole, more specifically between the end of coil 10 facing valve part 4 and parting plane 72.

According to a particularly preferred specific embodiment of the present invention, not only pressure sensor 70 but also signal, control and power electronics 74 are integrated into electronic part 68 of electromagnetic pressure regulating valve 1 to operate the latter. For example, in addition to pressure sensor 70, electronic part 68 integrated into pressure regulating valve 1 also includes at least one of the following devices: A voltage supply for pressure sensor 70, a communication interface to higher-level electronic control unit 66, a microprocessor or analog control electronics which calculates the manipulated variable from a deviation between an actual pressure value and a setpoint pressure value, power electronics for supplying voltage to the coil, capacitors for filtering the signal, and EMC (electromagnetic compatibility) protection, as well as a diagnostic device.

According to a further specific embodiment, electronic part 68 may include only pressure sensor 70, and the sensor signal is transmitted to higher-level control unit 66 via a single signal line.

Electronic part 68 is accommodated, for example, in a separate electronic housing 78, which is flange-mounted on a side connecting surface 80 of bobbin 8. When integrating signal electronics, control electronics and power electronics 74 into electronic part 68 of pressure regulating valve 1, it is possible to use only three electric connecting lines to establish all necessary connections to higher-level control unit 66. The supply voltage is transmitted via one line 82, the reference variable (pressure) and diagnosis/status information via a further bidirectional line 84, while a third line 86 forms the connection to ground.

Protruding from electronic housing 78 is a hydraulic connecting pipe 88 of pressure sensor 70, which is accommodated in a transverse bore hole 90 formed in bobbin 8, and the transverse bore hole, in turn, is connected to pressure chamber 50 or load connection 42 via an axial connecting channel 94 in bobbin 8 extending parallel to a center line 92 of pressure regulating valve 1. Since bobbin 8 is preferably formed by an injection molded part made of plastic, it enables a hydraulic connection to be established for pressure sensor 70 integrated into the electronic part without increasing production costs. FIG. 1 illustrates the terminal pins of electronic part 68 corresponding to lines 82, 84, 86, these pins being contacted by an associated connector, preferably using an insulation displacement connection or a pressure contact.

Ventilation poses a special difficulty in hydraulic systems. Non-ventilated pressure sensor connections may result in measurement errors due to the additional elasticity introduced by the air. A particular advantage of the present system is the fact that a ventilation of pressure sensor 70 may be carried out by inserting hydraulic connecting pipe 88 into transverse bore hole 90 without a sealing ring. Due to a suitable design of this transverse bore hole 90, for example by selectively incorporating surface roughness, longitudinal grooves or non-circularity into the radial inner circumferential surface of transverse bore hole 90, forced ventilation of pressure sensor 70 may be achieved via low leakage. To elastically tension pressure sensor 70 between a connecting surface 80 of bobbin 8 and a connector housing 98, O-rings 96, for example, are positioned between a bottom of electronic housing 78 and connecting surface 80.

On the other hand, the end face of connecting pipe 88 of pressure sensor 70 defines a surface to which the hydraulic pressure to be measured and present at load connection 42 is applied. The resulting compressive force is supported by a connector housing 98 made of injection-molded plastic, which is placed over solenoid sleeve 6 via an injection-molded ring section 100 and encompasses electronic housing 78. As a result, the forces acting upon pressure sensor 70 are supported in pressure regulating valve 1 itself.

Against this background, the pressure regulating device operates as follows: In the non-current-conducting state of the coil, closing ball 54 is placed under tension against associated valve seat 56 due to the hydraulic pressure prevailing at supply connection 36 and present on the pressure side of pressure generator 34. However, relatively weak restoring spring 26, whose compressive force is transmitted to closing ball 54 via armature 14 and actuating piston 22, is unable to raise the closing ball from valve seat 56. As a result, supply connection 36 is blocked with respect to load connection 42 and return connection 40. However, seating disk 46 is raised from its assigned flat seat 44 so that hydraulic fluid is able to flow from the clutch via load connection 42 to tank 38 connected to return connection 40. A control edge 102 of seating disk 46 is in a position in which it is unable to perform a throttle function, so that the pressure of return connection 40 prevails at load connection 42.

In the current-conducting state of coil 10, on the other hand, closing ball 54 is placed in its open position by the excursion movement of armature 14 and actuating piston 22 produced by magnetic forces. Hydraulic fluid then flows from pressure generator 34 to supply connection 36 and from there to throttle hole 52 and is divided into a partial flow to load connection 42 and return connection 40. Control edge 102 of seating disk 46 has approached flat seat 44, so that it throttles the partial current flowing from supply connection 58 to return connection 40. The magnitude of the excursion movement transmitted to armature 14 and thus to actuating piston 22 is electrically variable via the current flow in coil 10, which enables the throttle ratios of control edge 102 and the pressure ratios at load connection 42 to be regulated according to application, for example in such a way that the partial flow to load connection 42 is negligible and only a pressure signal is essentially present at this connection, while the partial flow through return connection 40 corresponds approximately to the entire flow through supply connection 58.

Figure 2:
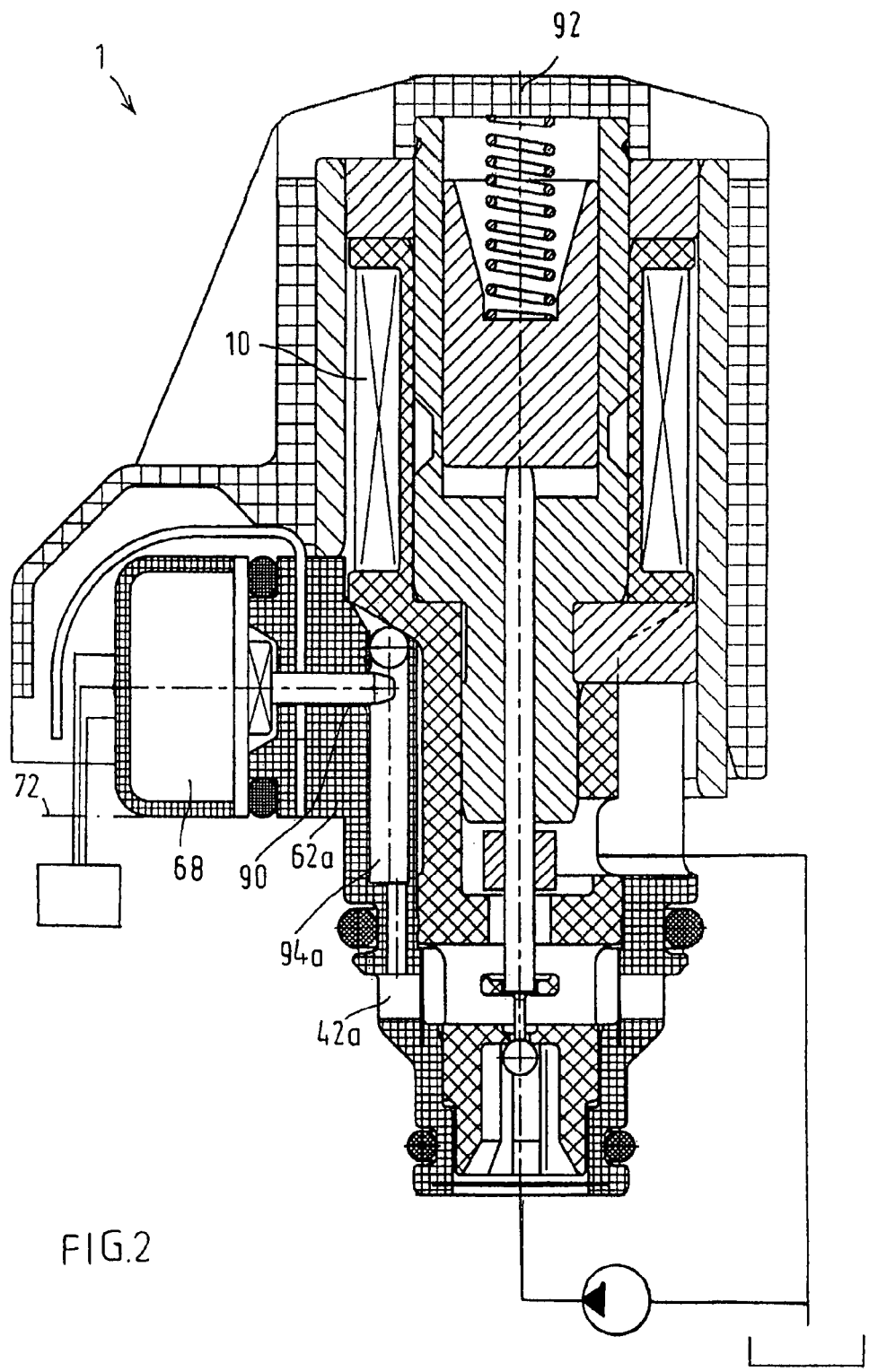
FIG. 2 shows a cross-sectional illustration of an electromagnetic pressure regulating valve according to a further embodiment of the present invention.

The second exemplary embodiment of a pressure regulating valve 1 illustrated in FIG. 2 is distinguished by a modified design. Modified components of the second exemplary embodiment are identified below by index a, while the reference numerals in FIG. 1 are used for identical components.

One of the differences is that electronic part 68 is flange-mounted directly on filter holder 62a, which extends on at least one side beyond parting plane 72 until it generally reaches the level of the end of coil 10 on the valve part side. In addition, connecting channel 94a, which extends parallel to center line 92 of pressure regulating valve 1, starting at transverse bore hole 90, opens directly into load connection 42a and, like the latter, is provided in filter holder 62a.

What is claimed is:

1. An electromagnetic pressure regulating valve device for regulating a hydraulic pressure, including at least one pressure regulating valve, the at least one pressure regulating valve comprising:
   a solenoid part including at least one bobbin holding an electric coil, a coil core and a movably guided armature;
   a valve part including at least one supply connection, a return connection, a load connection and an actuating element operated by the armature and cooperating with a valve seat; and
   an electronic part including at least one pressure sensor adapted to measure hydraulic pressure present at the load connection, the at least one pressure sensor being situated on an end of the solenoid part facing the valve part,
   wherein the electronic part is situated in an area of an end of the coil facing the valve part,
   wherein the valve part of the pressure regulating valve is inserted into a receptacle hole of a valve block, the electronic part is situated in the area of a parting plane between the valve part and the solenoid part protruding from the receptacle hole.

2. The pressure regulating valve device as recited in claim 1, wherein the electronic part is positioned between the end of the coil facing the valve part and the parting plane.

3. The pressure regulating valve device as recited in claim 1 wherein the electronic part is flange-mounted directly on the bobbin holding the coil.

4. The pressure regulating valve device as recited in claim 1, wherein the electronic part is flange-mounted directly on a filter holder holding a filter associated with the load connection and at least partially surrounding the valve part.

5. The pressure regulating valve device as recited in claim 1, wherein a hydraulic connection is provided between the pressure sensor and one of: (i) the load connection, or (ii) a pressure chamber provided in the valve part and connected to the load connection.

6. The pressure regulating valve device as recited in claim 5, wherein the hydraulic connection is developed in the bobbin.

7. The pressure regulating valve device as recited in claim 5, wherein the hydraulic connection is developed in a filter holder.

8. The pressure regulating valve device as recited in one of claim 1, wherein the pressure chamber is connected to the return connection when the actuating element is raised from the valve seat.

9. The pressure regulating valve device as recited in claim 1, wherein the valve part has a throttle point between the pressure chamber and the supply connection which cooperates with a closing member acted upon by a supply pressure and by the armature.

10. The pressure regulating valve device as recited in claim 1, wherein the electronic part includes at least one of the following devices: a voltage supply for the pressure sensor, a communication interface to a higher-level electronic control unit, a microprocessor or analog control electronics which calculates a manipulated variable from a deviation between an actual pressure value and a setpoint pressure value, power electronics for supplying voltage to the coil, capacitors for filtering the signal and for EMC protection, and a diagnostic device.

11. The pressure regulating valve device as recited in claim 10, wherein the pressure regulating valve is connected to the electronic control unit via three electric lines, a first one of the lines to supply voltage, a second one of the lines being a bidirectional line to transmit a reference variable and at least one of diagnosis and status information, and a third one of the lines to connect to ground.

12. The pressure regulating valve device as recited in claim 1, wherein the electronic part includes only the pressure sensor, and the sensor signal is transmitted to a higher-level control unit via a signal line.

* * * * *